US009319962B2

(12) United States Patent
Wetterwald et al.

(10) Patent No.: US 9,319,962 B2
(45) Date of Patent: Apr. 19, 2016

(54) LOCAL PATH REPAIR IN A WIRELESS DETERMINISTIC NETWORK

(71) Applicants: Patrick Wetterwald, Mouans Sartoux (FR); Jean-Philippe Vasseur, Saint Martin d'Uriage (FR); Pascal Thubert, La Colle sur Loup (FR)

(72) Inventors: Patrick Wetterwald, Mouans Sartoux (FR); Jean-Philippe Vasseur, Saint Martin d'Uriage (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 80 days.

(21) Appl. No.: 14/043,974

(22) Filed: Oct. 2, 2013

(65) Prior Publication Data

US 2015/0092595 A1 Apr. 2, 2015

(51) Int. Cl.
*H04W 40/04* (2009.01)
*H04W 72/04* (2009.01)
*H04W 40/34* (2009.01)
*H04W 40/38* (2009.01)
*H04L 12/721* (2013.01)
*H04L 12/707* (2013.01)
*H04L 12/703* (2013.01)

(52) U.S. Cl.
CPC ............... *H04W 40/04* (2013.01); *H04L 45/12* (2013.01); *H04L 45/22* (2013.01); *H04L 45/28* (2013.01); *H04W 40/34* (2013.01); *H04W 40/38* (2013.01); *H04W 72/0446* (2013.01)

(58) Field of Classification Search
CPC ..... H04W 40/04; H04W 40/34; H04W 40/38; H04W 72/0446; H04L 45/28; H04L 45/12; H04L 45/22
See application file for complete search history.

(56) References Cited

U.S. PATENT DOCUMENTS

| 8,363,662 B2 | 1/2013 | Thubert et al. |
| 8,447,849 B2 | 5/2013 | Shaffer et al. |
| 8,451,744 B2 | 5/2013 | Vasseur |
| 8,489,765 B2 | 7/2013 | Vasseur et al. |

(Continued)

FOREIGN PATENT DOCUMENTS

WO 2014/058936 A1 4/2014

OTHER PUBLICATIONS

PCT International International Search Report and Written Opinion, PCT Application PCT/US2014/057269, ISA/EP, European Patent Office, Netherlands, mailed Feb. 5, 2015 (twelve pages).

(Continued)

*Primary Examiner* — Paul H Masur
*Assistant Examiner* — Kabir Jahangir
(74) *Attorney, Agent, or Firm* — The Law Office of Kirk D. Williams

(57) ABSTRACT

In one embodiment, an initial path is established in a wireless deterministic network between a source and a destination through one or more intermediate nodes, which are typically informed of a required metric between the source and the destination for communicating a packet. The initial path is locally (e.g., without contacting a path computation engine) reconfigured to bypass at least one of the intermediate nodes creating a new path, with the new path meeting the requirement(s) of the metric. Note, "locally reconfiguring" refers to the network nodes themselves determining a replacement path without reliance on a path computation engine or other entity (e.g., network management system, operating support system) in determining the replacement path. In one embodiment, a network node not on the initial path replaces a node on the initial path while using the same receive and send timeslots used in the initial path.

14 Claims, 11 Drawing Sheets

(56) References Cited

U.S. PATENT DOCUMENTS

| | | | |
|---|---|---|---|
| 8,630,177 | B2 | 1/2014 | Vasseur et al. |
| 8,817,665 | B2 | 8/2014 | Thubert et al. |
| 9,112,788 | B2 | 8/2015 | Thubert et al. |
| 2006/0140111 | A1 | 6/2006 | Vasseur et al. |
| 2007/0183317 | A1* | 8/2007 | Vasseur et al. ............... 370/225 |
| 2008/0222478 | A1 | 9/2008 | Tamaki |
| 2008/0259923 | A1* | 10/2008 | Bryant et al. ............... 370/392 |
| 2011/0305136 | A1* | 12/2011 | Pan et al. .................... 370/218 |
| 2011/0305450 | A1* | 12/2011 | Pan et al. ......................... 398/8 |
| 2012/0155329 | A1 | 6/2012 | Shaffer et al. |
| 2012/0300668 | A1 | 11/2012 | Thubert et al. |
| 2012/0320923 | A1* | 12/2012 | Vasseur et al. ............... 370/400 |
| 2014/0006893 | A1 | 1/2014 | Shetty et al. |
| 2014/0233422 | A1 | 8/2014 | Thubert et al. |
| 2015/0023313 | A1 | 1/2015 | Thubert et al. |
| 2015/0023314 | A1 | 1/2015 | Thubert et al. |
| 2015/0023325 | A1 | 1/2015 | Wetterwald et al. |
| 2015/0023326 | A1 | 1/2015 | Thubert et al. |
| 2015/0023327 | A1 | 1/2015 | Thubert et al. |
| 2015/0023328 | A1 | 1/2015 | Thubert et al. |
| 2015/0071255 | A1 | 3/2015 | Wetterwald et al. |

OTHER PUBLICATIONS

Wei et al., "Industrial Deterministic Routing Extension for Low-Power and Lossy Networks," draft-wei-roll-scheduling-routing-02. txt, Apr. 15, 2013, The Internet Society, Reston, VA, USA (eighteen pages).

Awduche et al., "RSVP-TE: Extensions to RSVP for LSP Tunnels," RFC 3209, Dec. 2001, The Internet Society, Reston, VA (sixty-one pages).

Winter et al., "RPL: IPv6 Routing Protocol for Low-Power and Lossy Networks," RFC 6550, Mar. 2012, The Internet Society, Reston, VA, USA (157 pages).

Goyal et al., "Reactive Discovery of Point-to-Point Routes in Low-Power and Lossy Networks," RFC 6997, Aug. 2013, The Internet Society, Reston, VA, USA (forty pages).

Thubert et al, "Available Routing Constructs," draft-thubert-rtgwg-arc-00, Oct. 2, 2012, The Internet Society, Reston, VA, USA (nineteen pages).

Thubert et al, "Applying Available Routing Constructs to bicasting," draft-thubert-rtgwg-arc-bicast-00, Oct. 11, 2012, The Internet Society, Reston, VA, USA (ten pages).

"Media Access Control (MAC) Bridges and Virtual Bridge Local Area Networks," IEEE Std 802.1Q™-2011, Aug. 31, 2011, IEEE Computer Society, IEEE, New York, NY (one thousand three hundred sixty-five pages).

Braden et al., "Resource ReSerVation Protocol (RSVP)—Version 1 Functional Specification," RFC 2205, Sep. 1997, The Internet Society, Reston, VA, USA (112 pages).

Le Faucheur, Resource Reservation Protocol (RSVP) Extensions for Path-Triggered RSVP Receiver Proxy, RFC 5946, Oct. 2010, The Internet Society, Reston, VA, USA (thirty-five pages).

"Part 15.4: Low-Rate Wireless Personal Area Networks (LR-WPANs) Amendment 1: MAC sublayer," IEEE Std 802.15.4e™-2012, Apr. 16, 2012, IEEE Computer Society, IEEE, New York, NY (two hundred twenty-five pages).

Vasseur et al., "Path Computation Element (PCE) Communication Protocol (PCEP)," RFC 5440, Mar. 2009, The Internet Society, Reston, VA, USA (eighty-seven pages).

Wang et al., "6tus Layer Specification," draft-wang-6tsch-6tus-01, May 23, 2013, The Internet Society, Reston, VA, USA (fifty-six pages).

Yasukawa et al., "Operations and Management (OAM) Requirements for Point-to-Multipoint MPLS Networks," RFC 4687, Sep. 2006, The Internet Society, Reston, VA, USA (fourteen pages).

Bocci et al., "A Framework for MPLS in Transport Networks," RFC 5921, Jul. 2010, The Internet Society, Reston, VA, USA (fifty-six pages).

Atlas et al., "An Architecture for IP/LDP Fast-Reroute Using Maximally Redundant Trees," draft-ietf-rtgwg-mrt-frr-architecture-03, Jul. 12, 2013, The Internet Society, Reston, VA, USA (twenty-nine pages).

Ripphausen-Lipa et al., "The Vertex-Disjoint Menger Problem in Planar Graphs," SODA '93 Proceedings of the Fourth Annual ACM-SIAM Symposium on Discrete Algorithms, Society for Industrial and Applied Mathematics, Philadelphia, PA, 1993 (eight pages).

Thubert et al., "IETF 6TSCH: Combining IPv6 Connectivity with Industrial Performance," 2013 Seventh International Conference on Innovative Mobile and Internet Services in Ubiquitous Computing (IMIS), IEEE, New York, NY, Jul. 2013 (six pages).

"Deterministic Ethernet, IEEE 802.1 standards for real-time process control, industrial automation, and vehicular networks," available at http://www.ieee802.org/802_tutorials/2012-11/8021-tutorial-final-v4.pdf, Nov. 12, 2012, IEEE, New York, NY (seventy-two pages).

Watteyne et al., "Using IEEE802.15.4e TSCH in an LLN context: Overview, Problem Statement and Goals," draft-watteyne-6tsch-tsch-lln-context-02, May 23, 2013, The Internet Society, Reston, VA (twenty-three pages).

Farrel et al., "A Path Computation Element (PCE)-Based Architecture," RFC 4655, The Internet Society, Reston, VA (forty pages).

JP. Vasseur, "Terms used in Ruting (sic) for Low power and Lossy Networks," draft-ietf-roll-terminology-13.txt, Sep. 30, 2013, The Internet Society, Reston, VA, USA (eight pages).

JP. Vasseur, "Terms used in Routing for Low power and Lossy Networks," RFC 7102, Jan. 2014, The Internet Society, Reston, VA, USA (eight pages).

Thubert et al., "Applying Available Routing Constructs to bicasting," draft-thubert-rtgwg-arc-bicast-00, Oct. 11, 2012, The Internet Society, Reston, VA, USA (ten pages).

* cited by examiner

LOCAL PATH REPAIR IN A WIRELESS DETERMINISTIC NETWORK

TECHNICAL FIELD

The present disclosure relates generally to forwarding packets in a communications network, including, but not limited to, a wireless deterministic network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Deterministic networks rely on a set of predetermined time slots, which define at least a time (and possibly frequency to use—especially in a wireless deterministic network), when each specific node can communicate a packet to a second specific node in the deterministic network.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
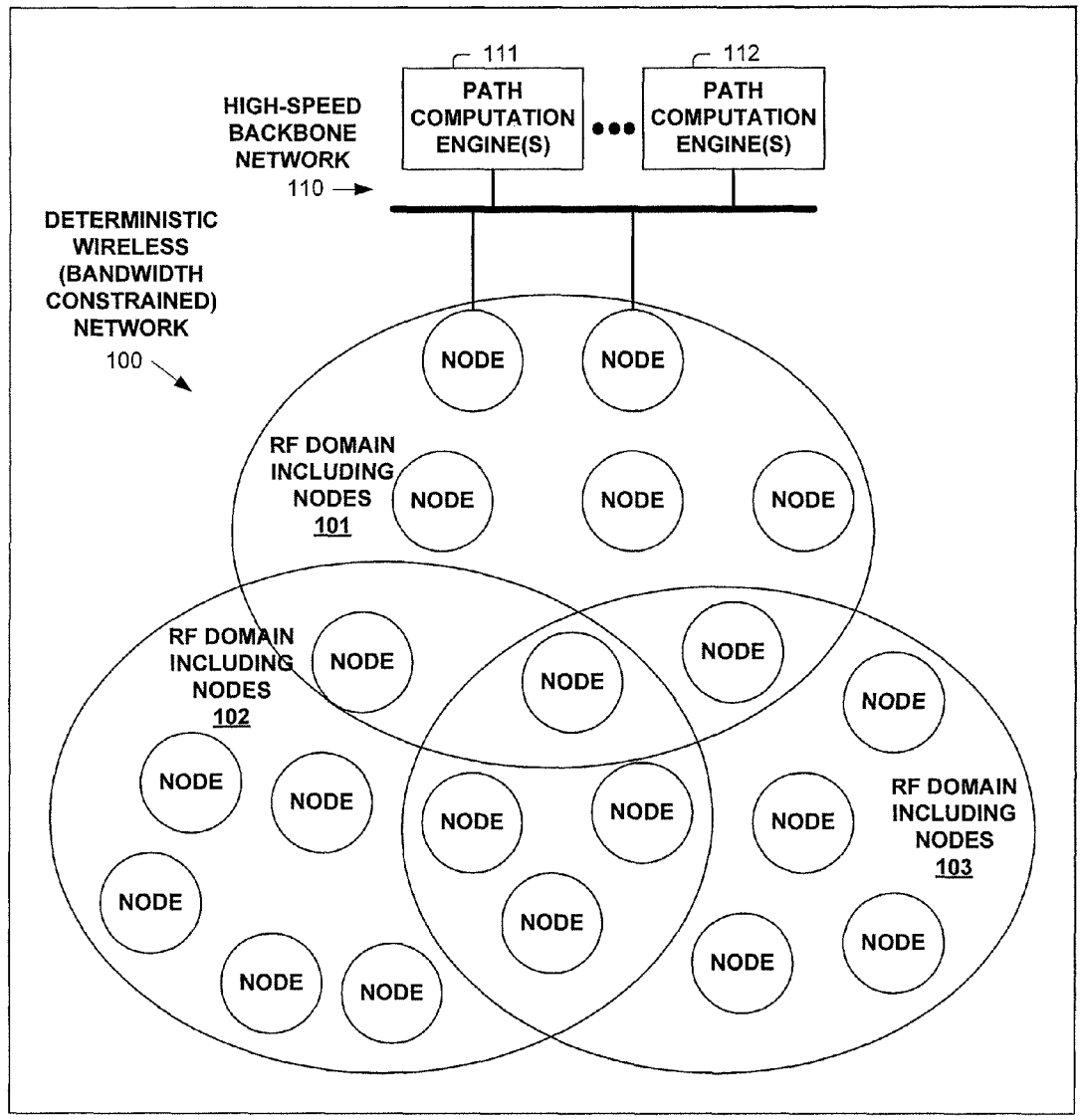
FIG. 1A illustrates a network operating according to one embodiment.

Disclosed are, inter alia, methods, apparatus, computer-storage media, mechanisms, and means associated with local path repair in a wireless deterministic network. One embodiment includes establishing an initial path in a wireless deterministic network between a source and a destination through one or more intermediate nodes; informing at least one node of said one or more intermediate nodes of a required metric between the source and the destination; and locally, without contacting a path computation engine, reconfiguring the initial path from the source to the destination to bypass at least one of said intermediate nodes creating a new path, wherein the new path meets the required metric.

In one embodiment, the initial path is initially determined by one or more path computation engines. Note, the term "locally" such as used in "locally reconfiguring" refers to the network nodes themselves determining a replacement path without reliance on a path computation engine or other entity (e.g., network management system, operating support system) in determining the replacement path.

In one embodiment, locally reconfiguring the initial path includes replacing only a single particular intermediate node with a replacement node in the network that is not part of the initial path. In one embodiment, locally reconfiguring the initial path includes: advertising, by the single particular intermediate node, a request to be replaced by another node in the network; and assuming the role of the single particular intermediate node in the initial path by the replacement node in the new path. In one embodiment, the advertisement includes advertising a receive timeslot for receiving a received packet by the single particular intermediate node in the initial path and a sending timeslot for sending the received packet in the initial path. In one embodiment, assuming the role includes the replacement node receiving a particular packet during the receive timeslot and sending the particular packet during the sending timeslot.

In one embodiment, locally reconfiguring the initial path includes replacing a plurality of particular intermediate nodes of said intermediate nodes with a plurality of replacement nodes in the network that are not part of the initial path. In one embodiment, locally reconfiguring the initial path includes advertising, by a node in the initial path, a request for a new path portion to the destination from a node in the initial path, with the request including an identification of the initial path and the required metric.

In one embodiment, locally reconfiguring the initial path includes forming a directed acyclic graph from a node in the initial path upstream of a particular node that is experiencing a communication issue or the particular node itself. In one embodiment, the directed acyclic graph rejoins a lower portion of the initial path using an identifier of the initial path. In one embodiment, the directed acyclic graph reaches the destination without rejoining the initial path, with the new path meeting the requirement(s) of the required metric.

2. Description

Disclosed are, inter alia, methods, apparatus, computer-storage media, mechanisms, and means associated with local path repair in a wireless deterministic network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

As used herein, a "time slot" refers an elementary communications entity including a period of time for sending or receiving information (e.g., a packet). In the context of a wireless network, a time slot is also typically associated with a frequency, as the information is not only transmitted within a time slot, but also at a frequency (e.g., channel).

Expressly, turning to the figures, FIG. 1 illustrates a network 100 (e.g., deterministic wireless network, which is bandwidth constrained) operating according to one embodiment. As shown, network 100 includes a high-speed (e.g., Ethernet) backbone network including one or more path computation engines 111-112. Deterministic wireless network 100 includes three overlapping different radio frequency (RF) domains 101, 102 and 103, each containing a plurality of nodes as shown in FIG. 1A. Note, typically and not shown, each of these network nodes (e.g., when a node operates as a bridge or router) is connected to a network of devices and/or directly connected to one or more devices. One embodiment uses more or less RF domains and/or nodes.

Figure 1B:
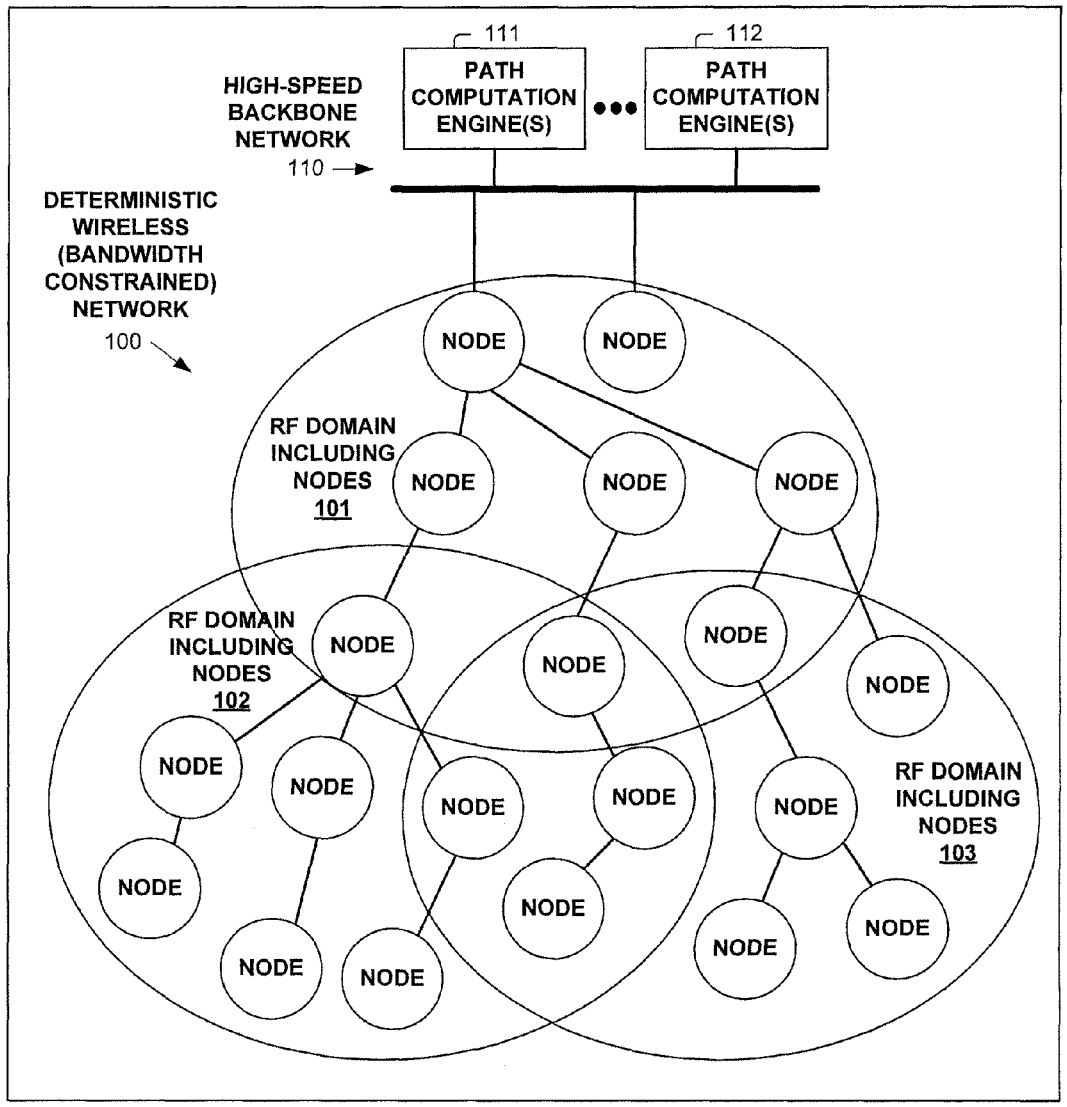
FIG. 1B illustrates a network operating according to one embodiment.

FIG. 1B illustrates the communication links established between nodes in RF domains 101, 102 and 103 to provide access to one or more path computation engines 111-112. In one embodiment, a communications path for transmitting packets between first and second nodes may traverse any set of nodes, and is not limited to one or more of the paths shown in FIG. 1B.

Figure 1C:
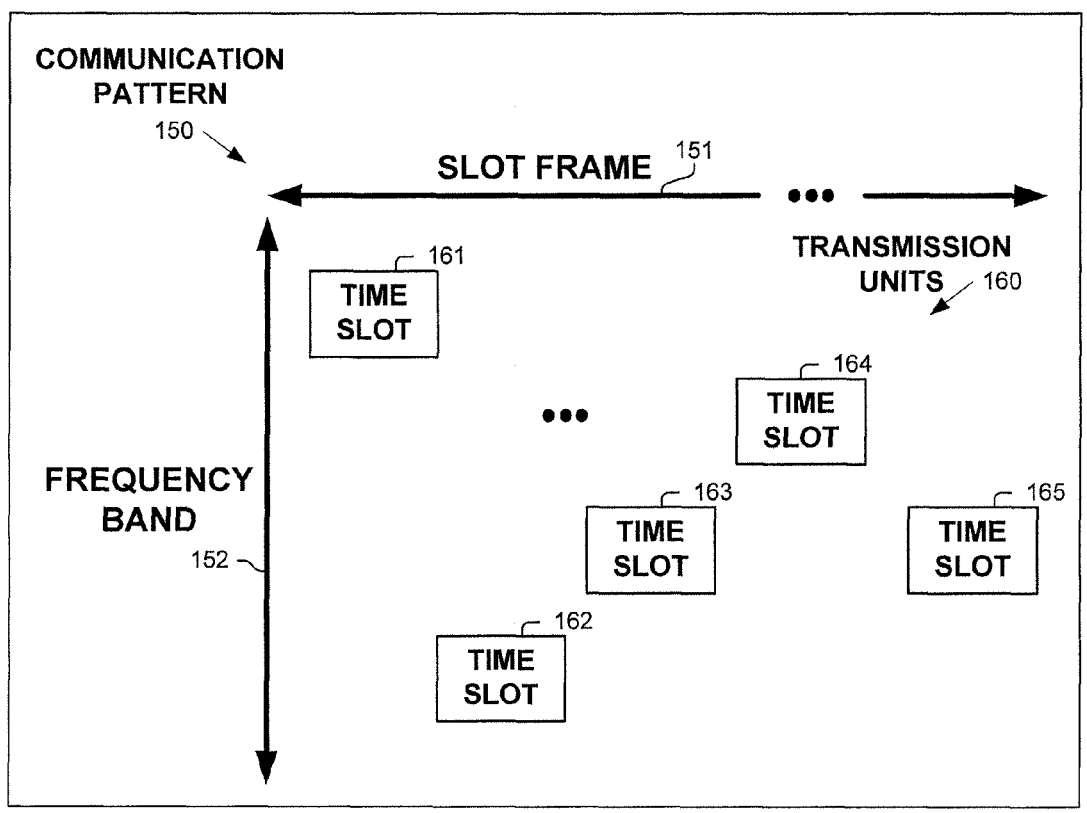
FIG. 1C illustrates a communication pattern operating according to one embodiment.

FIG. 1C illustrates a communication pattern 150 according to one embodiment of a deterministic network. Communication pattern 150 includes time slots 161-165, each of which provide a predetermined time for a sender to transmit a packet and for a receive to listen to receive the transmitted packet. A slot frame 151 (e.g., a Superframe when repeated typically with channel rotation) is a period of time divided into multiple time slots. Also, in a wireless (or fiber) a second dimension of frequency (152) is associated with each time slot 161-165. In one embodiment, a Superframe 151 is established by one or more path computation engines that defines a matrix of n time slots by m frequencies (e.g., channels). One or more of these n-m pairings is referred to herein as a time slot as multiple time slots might be used to send a packet (e.g., to have a predetermined retransmission time for the packet if required).

With reference to FIGS. 2A-D, illustrated are different configurations of a wireless deterministic network 200 (e.g., low power lossy network or "LLN"), including a source node 210, a destination node 215, and intermediate network nodes 211-214, 221-223, and 231-233.

Figure 2A:
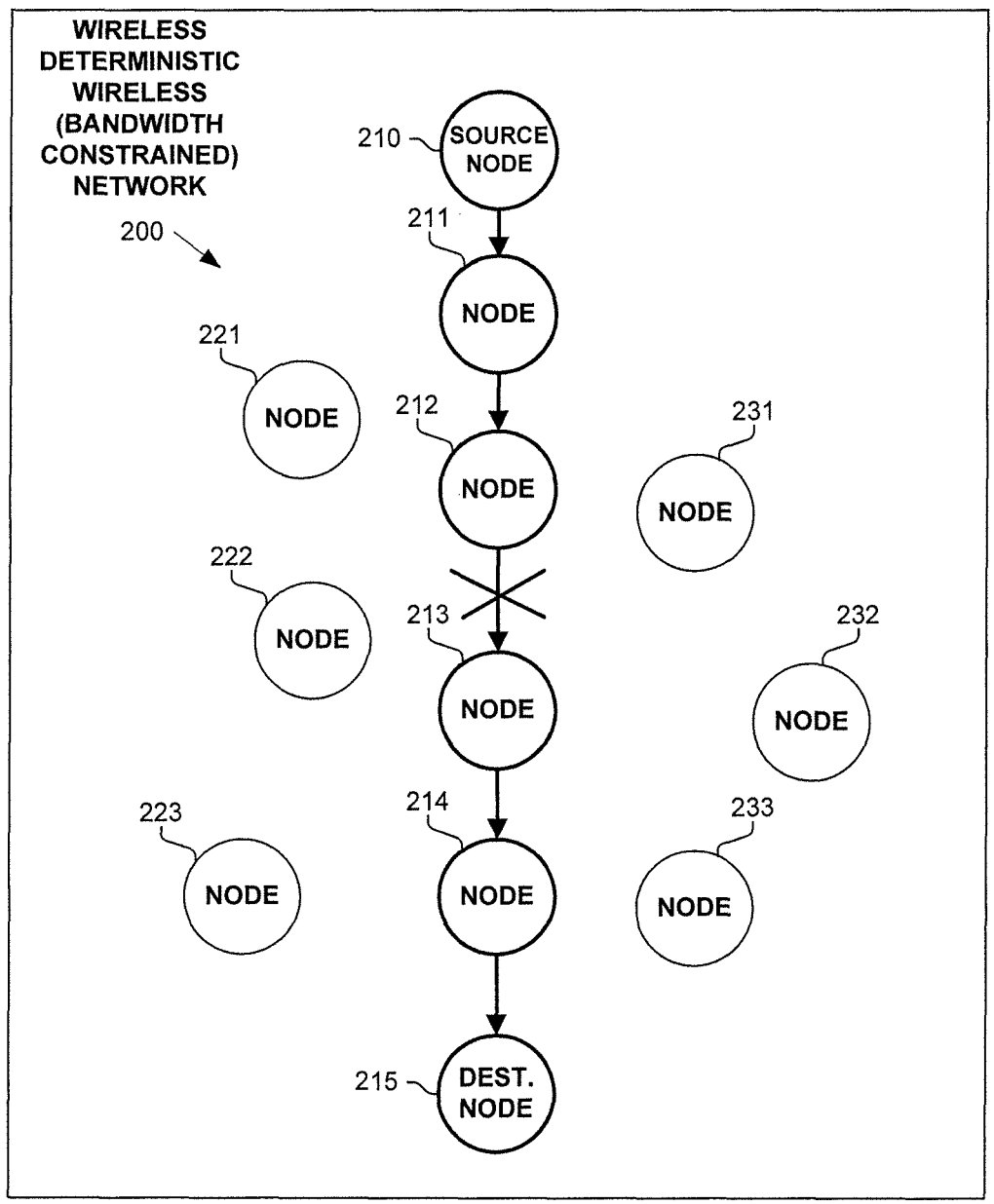
FIG. 2A illustrates a network operating according to one embodiment.

Shown in FIG. 2A is a path established between source 210 and destination 215 through intermediate nodes 211-214 for sending a packet (e.g., a progressive series timeslots for communicating information from node to node along the path). In one embodiment, one or more path computation engines are used in determining the path 211-214 between source node 210 and destination node 215. In one embodiment, each of nodes 211-214 is informed of a metric that is required to be met for communication between source node 210 and destination node 215. In one embodiment, this metric is a relative timeslot value. In one embodiment, this metric is an absolute time value. For example, in one embodiment, a service level agreement is established for communicating a packet from source node 210 to destination node 215. By informing each of nodes 211-214 along the initial path between source node 210 to destination node 215 of a metric reflective of this requirement, local repair of the initial path can be performed in a manner to meet the requirements of this metric (e.g., to meet the service level agreement).

Figure 2B:
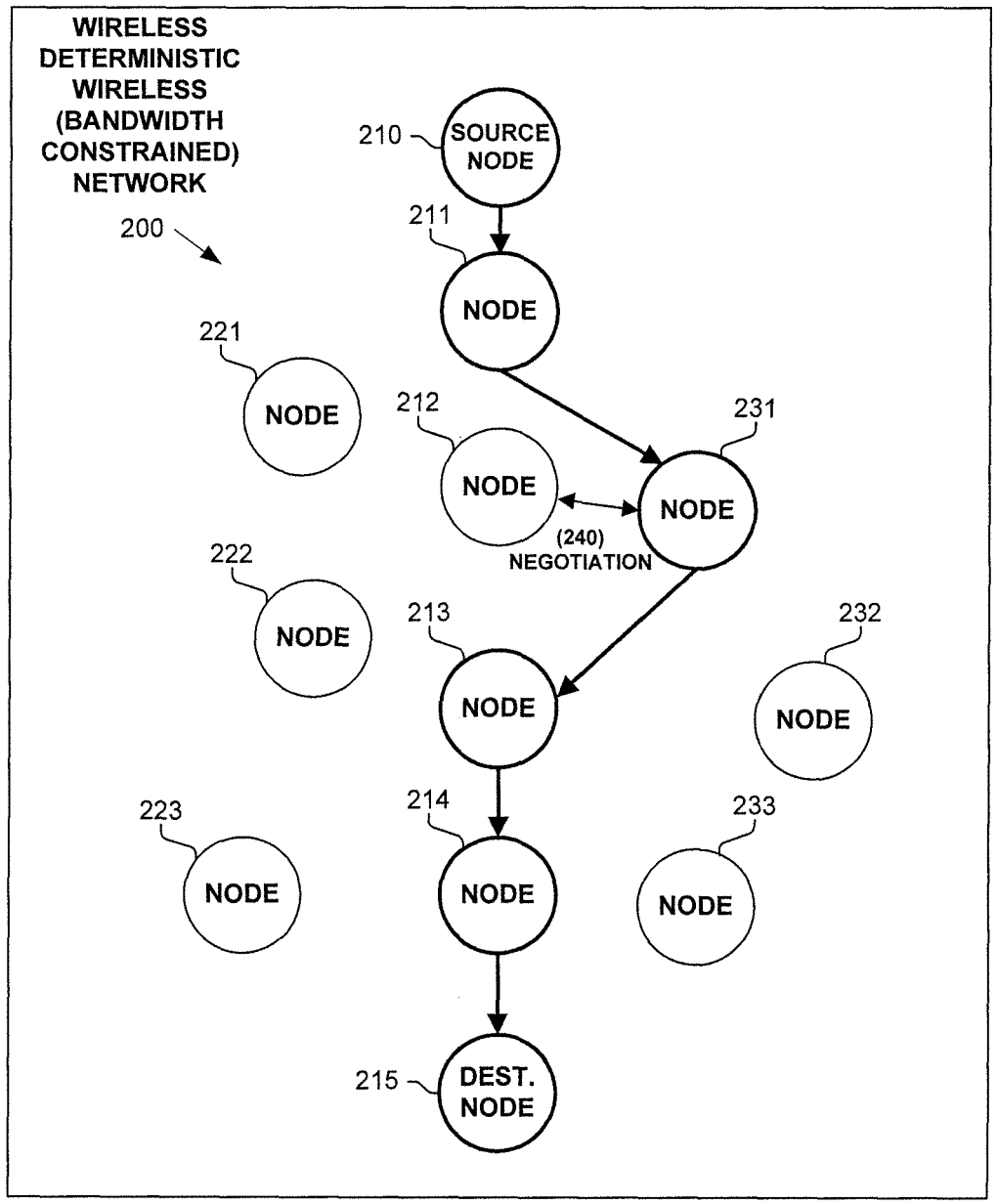
FIG. 2B illustrates a network operating according to one embodiment.
Figure 2C:
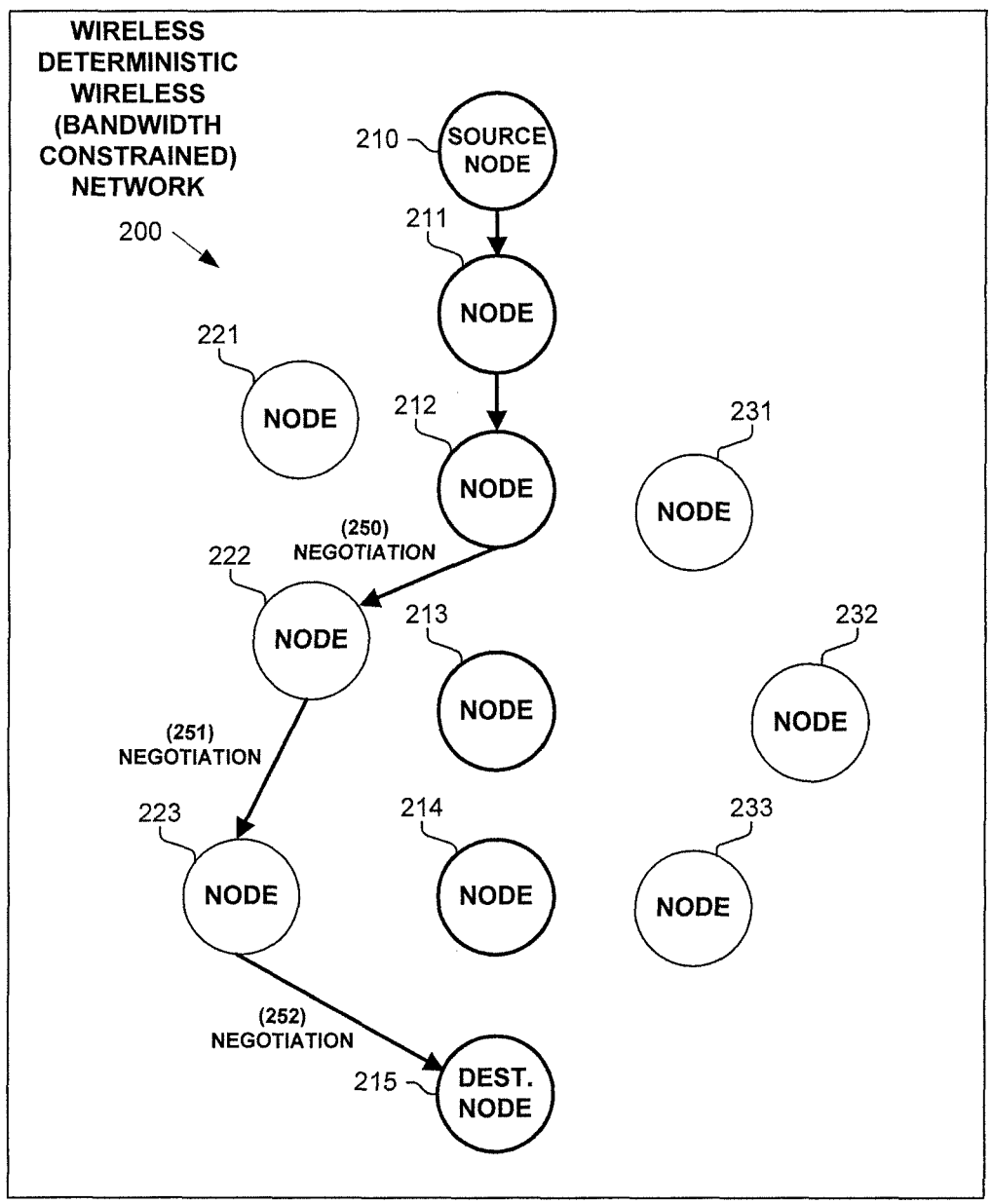
FIG. 2C illustrates a network operating according to one embodiment.
Figure 2D:
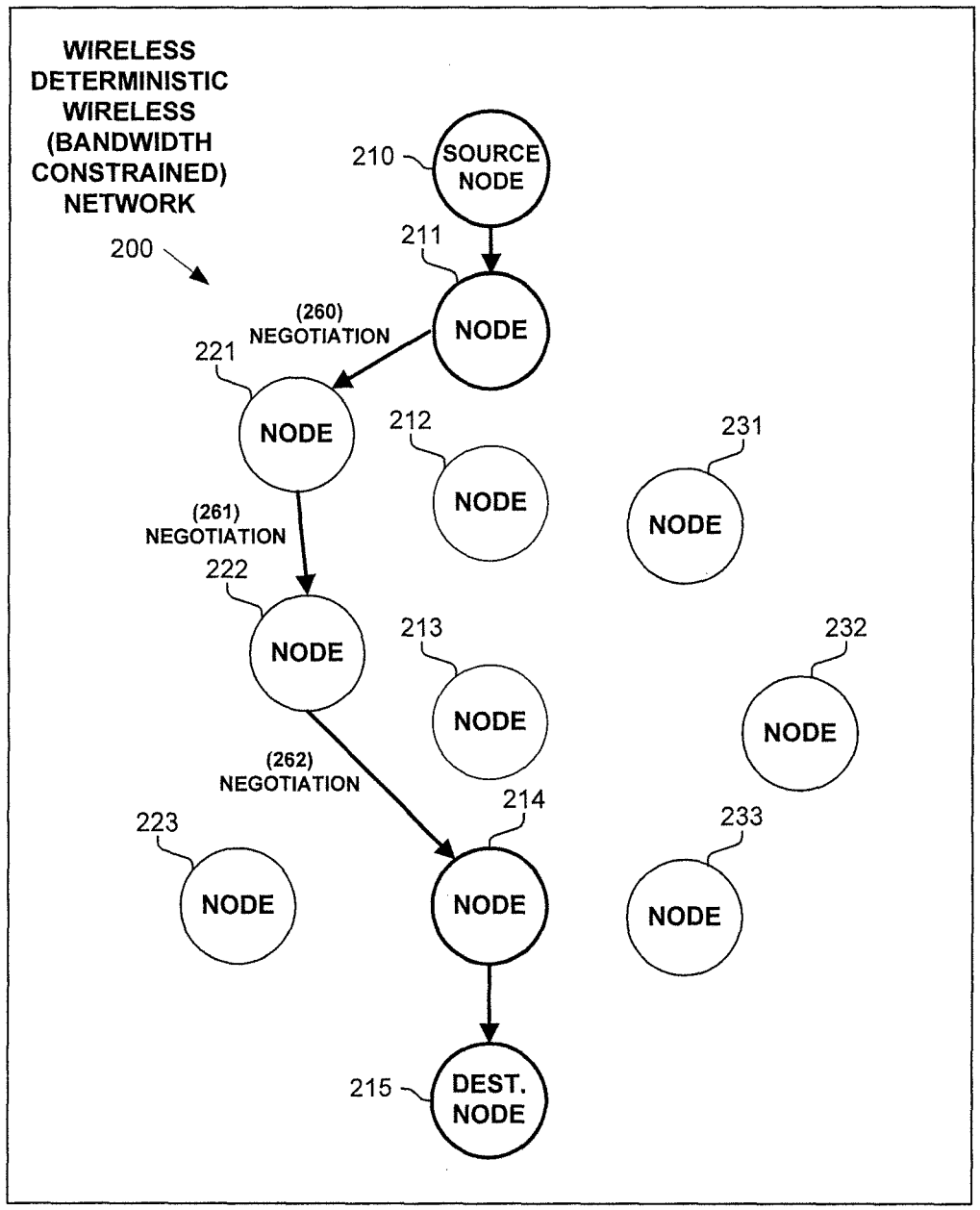
FIG. 2D illustrates a network operating according to one embodiment.

For illustrative purposes in regards to FIGS. 2B-2D, assume that the communication between nodes 212-213 is experiencing trouble, or expected to experience trouble in the near future (e.g., some loss, degradation, total loss). In one embodiment, node 212 will detect the problem (e.g., such as, but not limited to, resulting from not receiving acknowledgement messages for packets sent to node 213 in the corresponding timeslot of the initial path, or a received signal strength indication decreasing or following below some predetermined or dynamic threshold level).

With reference to FIG. 2B, in response to the communication issue between node 212 and 213, node 212 advertises a request for another node to take over the communication between node 211 and 213 of the initial path. In one embodiment, this advertisement includes an identification of each of nodes node 211 and 213. In one embodiment, this advertisement includes an identification of the timeslot to receive the packet from node 211 and the timeslot to send the packet to node 213. In one embodiment, node 212 will select a replacement node based on which node(s) responded to the advertisement. Some negotiation (240) is typically performed between node 212 and replacement node 231 as shown in FIG. 2B, such as to coordinate and have a reliable transfer of node 231's performance in the initial path (nodes 210-211-212-213-214-215) to replacing node 212's performance in the new path (nodes 210-211-231-213-214-215). In one embodiment, nodes 211 and 213 are not aware that node 231 replaced node 212 in the path. Note, as the replacement path includes a lower portion of the initial path, the requirement(s) of the requirement metric are fulfilled by definition, as the initial path fulfills these requirement(s) and thus, the timeslot on which destination node 215 will receive the packet will satisfy the required metric (e.g., within a predetermined maximum allowed time).

With reference to FIG. 2C, in response to the communication issue between node 212 and 213, node 212 will initiate the establishment of a replacement path from node 212 to destination node 215. One embodiment forms a directed acyclic graph from node 212 (or from an upstream node (e.g., 211) that is receiving the packet without a communication issue) to either a node downstream of node 212 in the initial path (e.g., to node 213 or 214) or to destination node 215. In one embodiment, this operation includes specifying an identification of the initial path. Thus, the directed acyclic graph can possibly rejoin the initial path at some point as the nodes can correlate the initial path with the directed acyclic graph based on this identification. It is also possible that the initial path might not be able to be rejoined because the packet arrives too late to a node on the initial path, so the sending timeslot on the initial path will have already occurred. However, a different timeslot could be used that still will allow the required metric to be fulfilled by the new path from that node on the initial path. Also, the directed acyclic graph may not traverse a node on the initial path, such as illustrated by new path 210-211-212-222-223-215. FIG. 2C further illustrates negotiation 250-252, which is typically performed among respective network nodes as required to establish the directed acyclic graph and to complete the new path. One embodiment forms the directed acyclic graph based on enhancements to RFC 6997.

With reference to FIG. 2D, illustrated is a replacement path 210-211-221-222-214-215. In one embodiment, the communication of the packet between intermediate node 214 to destination node 215 is performed according to the timeslot of the initial path (e.g., the replacement path rejoins the initial path). In one embodiment, the communication of the packet between intermediate node 214 to destination node 215 is performed not using the timeslot of the initial path, but with a timeslot established that still satisfies the constraint(s) of the required metric. FIG. 2D illustrates that a node 211 upstream of a node 212 experiencing the communication problem (e.g., as illustrated in FIG. 2A) can be a divergent point in the initial path for establishing the replacement path.

Figure 3:
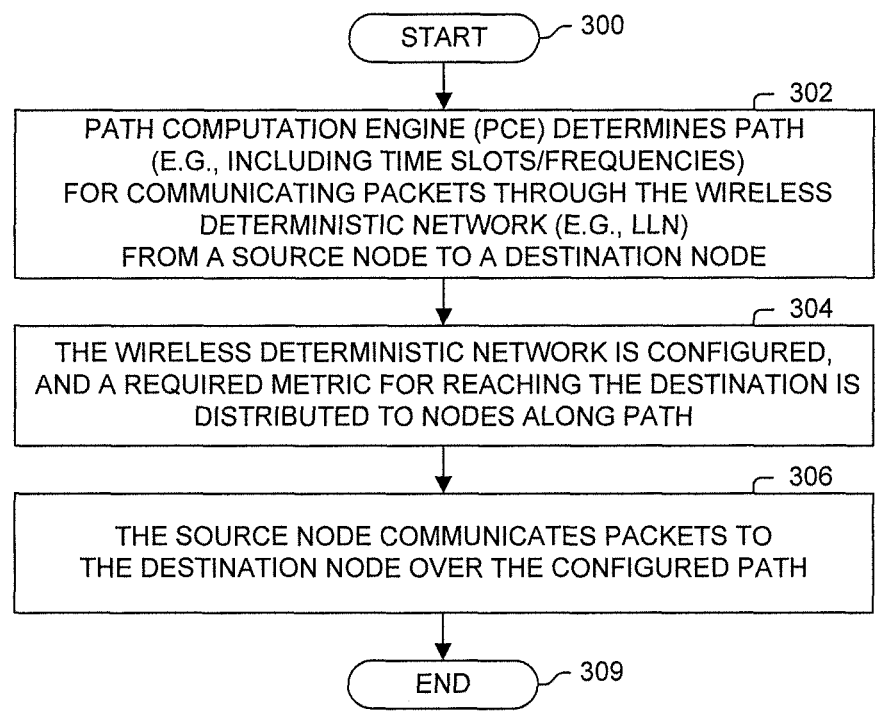
FIG. 3 illustrates a process according to one embodiment.

FIG. 3 illustrates a process performed in one embodiment. Processing begins with process block 300. In process block 302, a path computation engine determines an initial path (e.g., including timeslots/frequencies) through the wireless deterministic network from a source node to a destination node. In process block 304, the network is configured accordingly, and a required metric (e.g., indicating maximum time from source to destination) for communicating the packet from the source to the destination is distributed to the nodes on the initial path. For example, the required metric might be 90 milliseconds. If the initial path communicates the packet from the source node to the destination node in 60 milliseconds, then the replacement path may have an end-to-end extra 30 milliseconds to communicate the packet from source to destination. In process block 306, the source node communicates packets to the destination node over the established initial path through the wireless deterministic network. Processing of the flow diagram of FIG. 3 is complete as indicated by process block 309

Figure 4:
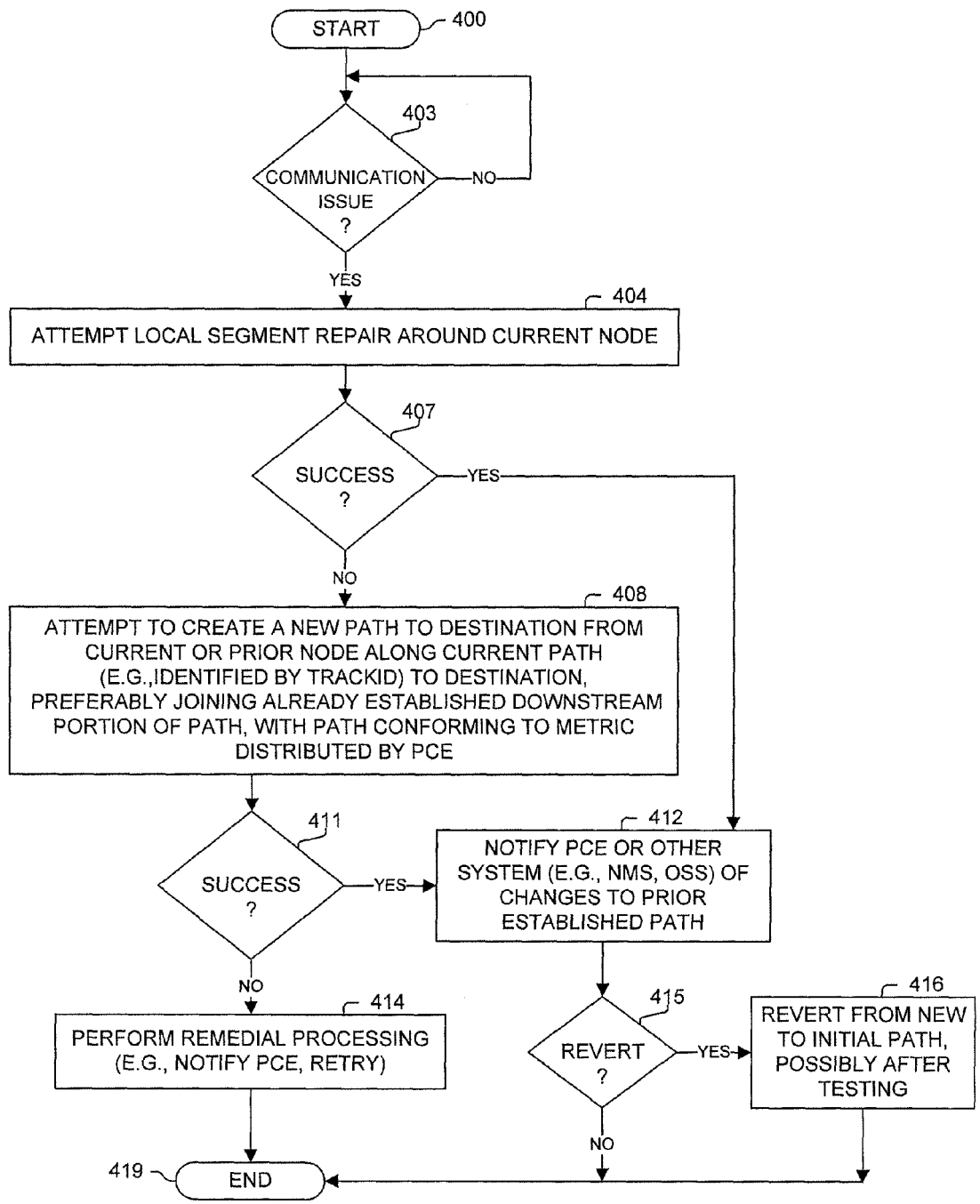
FIG. 4 illustrates a process according to one embodiment.

FIG. 4 illustrates a process performed in one embodiment. Processing begins with process block 400, and loops at process block 403 until a current node identifies a communication problem with the initial path. After such a communications problem is identified, processing continues to process block 404 wherein attempt is made to perform a local segment repair around the current node (e.g., such as, but not limited to, that illustrated in relation to FIG. 2B). One embodiment of the processing of process block 404 is described in relation to the flow diagram of FIG. 5, described infra.

As determined in process block 407, if the local segment repair was successful, then processing continues to process block 412. Otherwise, if the local segment repair was not successful, then in process block 408, an attempt is made to create a new path to the destination from the current node or a prior node along the initial path (e.g., such as, but not limited to, that illustrated in relation to FIG. 2C and/or FIG. 2D). In one embodiment, the new path rejoins the initial path. In one embodiment, the new path continues to the destination node without rejoining the initial path. One embodiment specifies an identification of the initial path and/or the required metric for establishing the new path preferably rejoining the initial path (e.g., as resources have been used to already establish the rest of the path to the destination that meet the required metric), but may establish the new path without rejoining the initial path while still meeting the requirements of the metric. As determined in process block 411, if the new path was successfully created then processing proceeds to process block 412. Otherwise, a new path could not be established, and processing proceeds to process block 414, wherein remedial processing (e.g., retry, error notification to a path computation engine, network management system, or operation support system) is performed.

In response to successfully creating a new path as determined in process block 407 or 411, then in process block 412, notification of the creation of the new path (and identification of the path itself) is typically provided to a path computation engine, network management system, or operation support system. In one embodiment, the path computation engine, network management system, or operation support system accepts the new path, or it may cause a new path between the source node and the destination node to be determined and established through the network. This new path may trigger other network changes based on its effect on network nodes and other routes. In one embodiment, this notification is provided immediately or delayed. In one embodiment, as determined by process block 415, the network nodes may attempt to locally revert to the initial path from the new path, such as based on the result of probes sent between nodes of the initial path to identify the feasibility of reverting to the original path. The path computation engine, network management system, or operation support system is notified accordingly.

Processing of the flow diagram of FIG. 4 is complete as indicated by process block 419.

Figure 5:
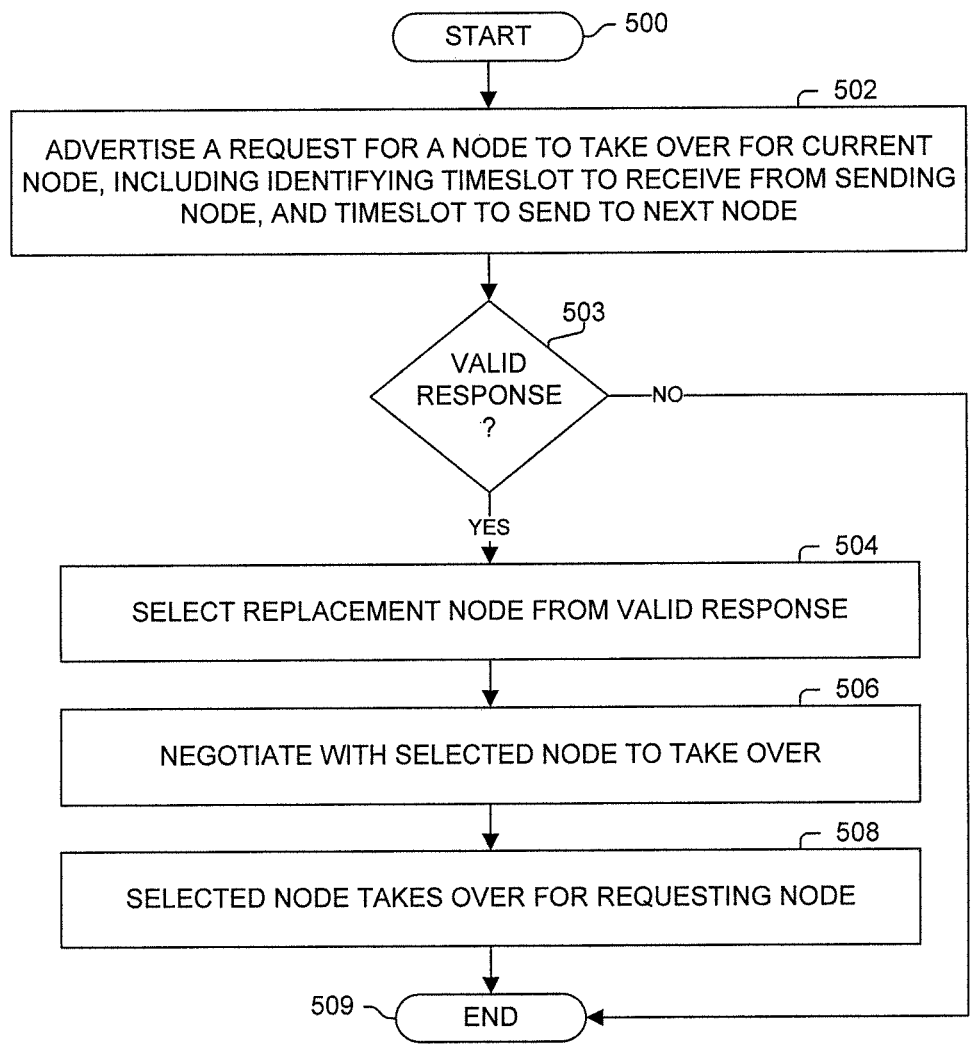
FIG. 5 illustrates a process according to one embodiment.

FIG. 5 illustrates a process performed in one embodiment. Processing begins with process block 500. In process block 502, an original node attempting to find a replacement node for itself in a path advertises a request for its replacement. Typically, such a request in a wireless deterministic network includes a timeslot for receiving a packet by the original node and the subsequent timeslot for sending the packet from the original node. In one embodiment, the advertised request also includes an identification of the sending node sending the packet to the original node and/or the receiving node to which the original node is to send the packet. This advertisement is typically a multicast or broadcast message during a timeslot that network nodes commonly listen (e.g., an administrative channel), or could be piggybacked on messages sent to network nodes.

As determined in process block 503, if there are not any valid replies of possible replacement nodes, then processing of the flow diagram of FIG. 5 is complete as indicated by process block 509. Otherwise, one or more valid responses identifying a replacement node have been received as determined in process block 503. Then, in process block 504, a replacement node is selected based on the received responses. In one embodiment, these reply messages indicate a received signal strength indication for receiving a packet from the node in the initial path that will send the replacement node the packet and/or the node in the initial path to which the replacement node will send the packet.

In process block 506, the original node negotiates with the selected replacement node to cause a smooth transfer, which occurs in process block 508, with the replacement node taking over for the original node (e.g., such as illustrated and described in relation to FIG. 2B). In one embodiment, no media access control address (MAC address) swapping is used, while in one embodiment it is. Processing of the flow diagram of FIG. 5 is complete as indicated by process block 509.

Figure 6A:
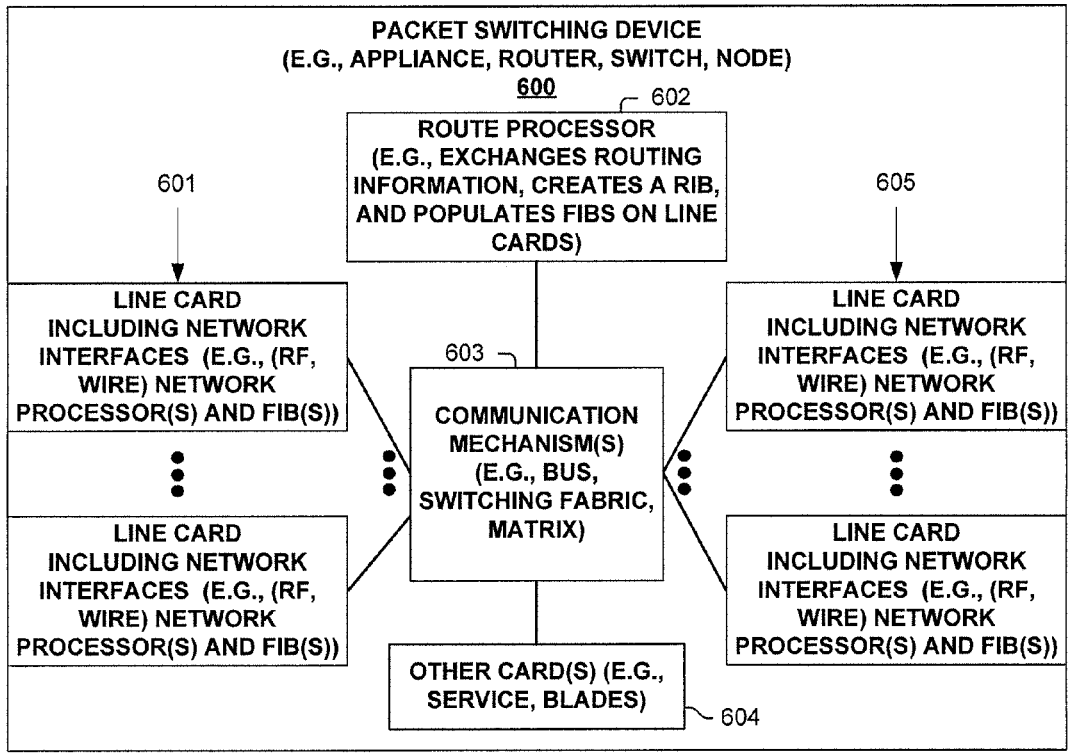
FIG. 6A illustrates a packet switching device according to one embodiment.

One embodiment of a packet switching device 600 (e.g., one example of a network node) is illustrated in FIG. 6A. As shown, packet switching device 600 includes multiple line cards 601 and 605, each with one or more network interfaces for sending and receiving packets over communications links, and with one or more processing elements that are used in one embodiment associated with local path repair in a wireless deterministic network. Packet switching device 600 also has a control plane with one or more processing elements 602 for managing the control plane and/or control plane processing of packets associated with local path repair in a wireless deterministic network. Packet switching device 600 also includes other cards 604 (e.g., service cards, blades) which include processing elements that are used in one embodiment to process packets associated with local path repair in a wireless deterministic network, and some communication mechanism 603 (e.g., bus, switching fabric, matrix) for allowing its different entities 601, 602, 604 and 605 to communicate. In one embodiment, packet switching device 600 has one or more RF interfaces (possibly only one such interface), such as, but not limited to that based on TREE 802.15.4e.

Figure 6B:
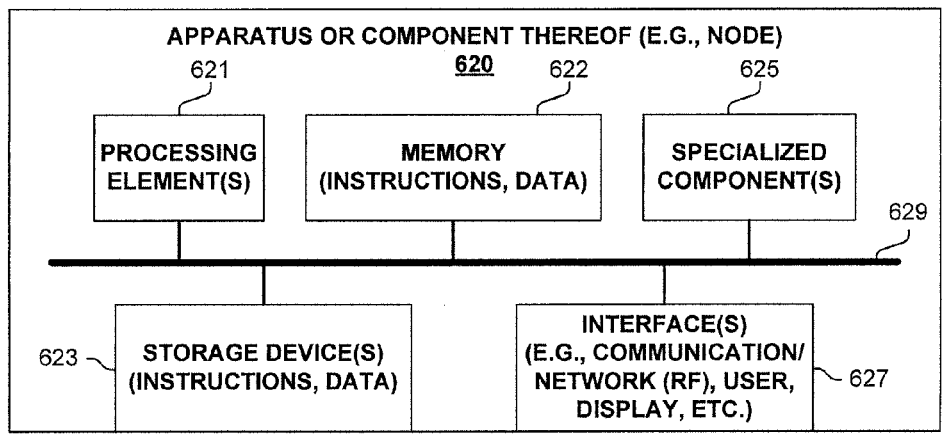
FIG. 6B illustrates an apparatus according to one embodiment.

FIG. 6B is a block diagram of an apparatus 620 (e.g., path computation engine or a network node, or portion thereof) used in one embodiment associated with local path repair in a wireless deterministic network. In one embodiment, apparatus 620 performs one or more processes, or portions thereof, corresponding to one of the flow diagrams illustrated or otherwise described herein, and/or illustrated in another diagram or otherwise described herein.

In one embodiment, apparatus 620 includes one or more processing element(s) 621, memory 622, storage device(s) 623, specialized component(s) 625 (e.g. optimized hardware such as for performing lookup and/or packet processing operations, etc.), and interface(s) 627 for communicating information (e.g., sending and receiving packets, user-interfaces, displaying information, etc.), which are typically communicatively coupled via one or more communications mechanisms 629, with the communications paths typically tailored to meet the needs of a particular application. In one embodiment, interface 627 is one or more RF interfaces, such as, but not limited to that based on IEEE 802.15.4e.

Various embodiments of apparatus 620 may include more or fewer elements. The operation of apparatus 620 is typically controlled by processing element(s) 621 using memory 622 and storage device(s) 623 to perform one or more tasks or processes. Memory 622 is one type of computer-readable/computer-storage medium, and typically comprises random access memory (RAM), read only memory (ROM), flash memory, integrated circuits, and/or other memory components. Memory 622 typically stores computer-executable instructions to be executed by processing element(s) 621 and/or data which is manipulated by processing element(s) 621 for implementing functionality in accordance with an embodiment. Storage device(s) 623 are another type of computer-readable medium, and typically comprise solid state storage media, disk drives, diskettes, networked services, tape drives, and other storage devices. Storage device(s) 623 typically store computer-executable instructions to be executed by processing element(s) 621 and/or data which is manipulated by processing element(s) 621 for implementing functionality in accordance with an embodiment.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

determining an initial path in a wireless deterministic network between a source and a destination through one or more intermediate nodes by one or more path computation engines that is not the source, the destination nor said one or more intermediate nodes, with the wireless deterministic network being a low power lossy network, with each of the source, the destination, and said one or more intermediate nodes being a low power lossy network node;

establishing the initial path from the source and destination through said one or more intermediate nodes based on a set of predetermined timeslots;

communicating packets over the initial path from the source and destination through said one or more intermediate nodes using the set of predetermined timeslots;

informing at least one node of said one or more intermediate nodes of a required metric including a receiving timeslot for receiving a packet from a prior node in the initial path and a sending timeslot for sending the packet to a next node in the initial path; and locally, without contacting any of said one or more path computation engines, reconfiguring the initial path from the source to the destination to bypass at least one of said intermediate nodes creating a new path, wherein the new path communicates packets using the sending and receiving timeslots.

2. The method of claim 1, wherein said locally reconfiguring the initial path includes replacing only a single particular intermediate node of said one or more intermediate nodes with a replacement node in the network that is not part of the initial path, which includes advertising, by the single particular intermediate node, a request to be replaced by another node in the network; and assuming the role of the single particular intermediate node in the initial path by the replacement node in the new path.

3. The method of claim 2, wherein said one or more intermediate nodes includes a plurality of nodes.

4. The method of claim 2, comprising:
receiving a response to said advertised request from a plurality of possible replacement nodes in the wireless deterministic network, with the plurality of possible replacement nodes including the replacement node; and
selecting the replacement node based on said responses from the plurality of possible replacement nodes by the single particular intermediate node.

5. A method, comprising:
establishing an initial path in a wireless deterministic network between a source and a destination through one or more intermediate nodes based on a set of predetermined timeslots to communicate packets between adjacent nodes in the initial path, with the wireless deterministic network being a low power lossy network, with each of the source, the destination, and said one or more intermediate nodes being a low power lossy network node;
communicating packets over the initial path from the source and destination through said one or more intermediate nodes using the set of predetermined timeslots;
informing at least one node of said one or more intermediate nodes of a required metric including an absolute time value, a receiving timeslot for receiving a packet from a prior node in the initial path, or a sending timeslot for sending a packet to a next node in the initial path;
locally reconfiguring the initial path from the source to the destination replacing a plurality of particular intermediate nodes of said intermediate nodes with a plurality of replacement nodes in the wireless deterministic network that are not part of the initial path, wherein the new path meets required metric.

6. The method of claim 5, wherein the new path includes:
at least one node of said intermediate nodes in the initial path between the source and the plurality of replacement nodes, and at least one node of said intermediate nodes in the initial path between the plurality of replacement nodes and the destination.

7. The method of claim 6, wherein said at least one node of said intermediate nodes in the initial path between the plurality of replacement nodes and the destination communicates packets over the new path using the receiving timeslot or the sending timeslot.

8. The method of claim 5, wherein said locally reconfiguring the initial path includes advertising, by a node in the initial path, a request for a new path portion to the destination from a node in the initial path, with the request including an identification of the initial path and the required metric.

9. The method of claim 8, wherein said locally reconfiguring the initial path includes forming a directed acyclic graph from a node in the initial path upstream of a particular node that is experiencing a communication issue with a next particular node of the plurality of intermediate nodes in the initial path or from the particular node to the next particular node.

10. The method of claim 8, wherein said locally reconfiguring the initial path includes forming a directed acyclic graph from a node in the initial path upstream of a particular node that is experiencing a communication issue with a next particular node of the plurality of intermediate nodes in the initial path or from the particular node to a node of the plurality of intermediate nodes downstream of the next node in the initial path.

11. The method of claim 10, using the identification of the initial path to rejoin the directed acyclic graph back into a lower portion of the initial path.

12. The method of claim 8, wherein said locally reconfiguring the initial path includes forming a directed acyclic graph from a node in the initial path upstream of a particular node that is experiencing a communication issue with a next particular node of the plurality of intermediate nodes in the initial path to the destination, or from the particular node to the destination.

13. The method of claim 5, comprising initially determining the initial path by one or more path computation engines external to the wireless deterministic network.

14. A wireless deterministic network node, comprising:
one or more radio interfaces configured to receive a packet during a receiving timeslot and to send the packet during a sending timeslot in communicating packets along a communications path in a wireless deterministic network that is a low power lossy network;
memory; and
one or more processing elements;
wherein the wireless deterministic network node is a low power lossy network node configured to:
advertise a request to be replaced in the communications path by another node in the wireless deterministic network, with the request including advertising the receiving timeslot and the sending timeslot;
select a replacement node from one or more responses received from one or more other low power lossy network nodes in the wireless deterministic network, with said one or more other low power lossy network nodes including a replacement node; and
notify the replacement node to assume the role of the wireless deterministic network node in the communications path of receiving a particular packet during the receive timeslot and sending the particular packet during the sending timeslot.

* * * * *